United States Patent Office 3,780,103
Patented Dec. 18, 1973

3,780,103
ALKYLHYDROXYBENZYLAMIDES
Martin Knell, Ossining, N.Y., assignor to Ciba-Geigy Corporation, Ardsley, N.Y.
No Drawing. Filed Mar. 30, 1967, Ser. No. 626,927
Int. Cl. C07c 103/38
U.S. Cl. 260—559 A    7 Claims

ABSTRACT OF THE DISCLOSURE

N-(alkylhydroxybenzyl)alkan- or alkenamides, which are stabilizers of organic materials susceptible to oxidative deterioration, are obtained through condensation of an alkylhydroxybenzyl alcohol and an alkanenitrile, alkanedinitrile, or alkenenitrile, the product in the last instance being optionally subjected to an addition reaction with an alkane mercaptan. A typical embodiment is N-(3,5-di-t-butyl-4-hydroxybenzyl)dodecanamide.

DETAILED DESCRIPTION

This invention relates to novel amides which are useful in the stabilization of organic materials normally subject to oxidative deterioration.

In particular the present invention pertains to compounds of the formula:

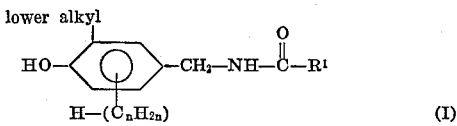

(I)

wherein $R^1$ is alkyl of from 1 to 30 carbon atoms, alkenyl of from 2 to 30 carbon atoms, alkylthioethyl wherein the alkyl groups contains from 1 to 30 carbon atoms, or the group

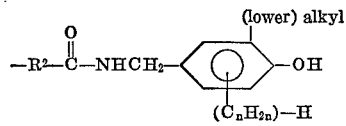

wherein
$R^2$ is alkylene of from 1 to 10 carbon atoms or

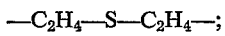

$-C_2H_4-S-C_2H_4-$;

and
$n$ has a value of from 0 to 6.

By the term "alkyl" and derivations thereof such as "alkylene" or "alkanoyl" is intended when used herein a group containing a branched or straight chain hydrocarbon chain of from 1 to 30 carbon atoms inclusively. It is to be understood that when the nature of groups such as unsaturation in "alkenyl" requires at least two carbon atoms, the carbon chain will contain from 2 to 30 carbon atoms. Representative of such alkyl groups are thus methyl, ethyl, propyl, butyl, t-butyl, octyl, decyl, dodecyl, tetradecyl, octadecyl, eicosyl and the like. When the term "alkyl" is herein qualified by the designation "(lower)," there is intended a branched or straight chain hydrocarbon of from about 1 to about 6 carbon atoms.

It will be observed, that the (lower)alkylphenolic moiety in Formula I exhibits at least one (lower)alkyl group in a position ortho to the hydroxy group. A second (lower)alkyl group is optionally present, either (a) in the other position ortho to the hydroxy group or (b) meta to the hydroxy group and para to the first (lower) alkyl group. Although not so limited, these (lower)alkyl groups are preferably branched groups such as t-butyl or i-propyl. Other arrangements, such as for example a 3-t-butyl-5-methyl-p-phenolic moiety, are however clearly envisioned.

The compounds of the present invention demonstrate the ability to stabilize organic material normally subject to oxidative deterioration. Materials which are thus stabilized according to the present invention include synthetic organic polymeric substances such as vinyl resins formed from the polymerization of vinyl halides or from the copolymerization of vinylhalides with unsaturated polymerizable compounds, e.g., vinyl esters, $\alpha,\beta$-unsaturated acids, $\alpha,\beta$-unsaturated esters, $\alpha,\beta$-unsaturated ketones, $\alpha,\beta$-unsaturated aldehydes and unsaturated hydrocarbons such as butadienes and styrene; poly-$\alpha$-olefins such as polyethylene, polypropylene, polybutylene, polyisoprene and the like, including copolymers of poly-$\alpha$-olefins; polyurethanes such as are prepared from polyols and organic polyisocyanates; polyamides such as polyhexamethylene adipamide; polyesters such as polymethylene terephthalates; polycarbonates; polyacetals; polystyrene, polyethyleneoxide; and copolymers such as those of high impact polystyrene containing copolymers of butadiene and styrene and those formed by the copolymerization of acrylonitrile, butadiene and/or styrene. Other materials stabilized according to the present invention includes lubricating oil of the aliphatic ester type, e.g., di-(2-ethylhexyl)azelate, pentaerythritol tetracaproate and the like; animal and vegetable derived oils, e.g., linseed oil, tallow, fat, lard, peanut oil, cod liver oil, castor oil, palm oil, corn oil, cotton seed oil and the like; hydrocarbon material such as gasoline, both natural and synthetic, diesel oil, mineral oil, fuel oil, cutting fluids, waxes, resins and the like; fatty acids; soap; and the like.

In general the stabilizers of this invention are employed from about 0.005% to about 10% by weight of the stabilized composition. A particularly advantageous range for polyolefins such as polypropylene is from about 0.05% to about 5%, especially from about 0.1% to about 1%.

Other additives such as pourpoint depressants, corrosion and rust inhibitors, dispersing agents, demulsifiers, antifoam agents, carbon black, accelerators, plasticizers, color stabilizers, heat stabilizers, ultraviolet light absorbers, dyes and dyesites, pigments, chelating agents, thioesters, and the other antioxidants may also be present depending upon the particular application involved.

The compounds of the present invention are conveniently prepared through condensation of an alkylhydroxybenzyl alcohol and a mono- or dinitrile in the presence of an acid catalyst such as mineral acids. Generally the nitrile can be employed as the reaction medium. Inert organic solvents can optionally be employed.

Alternatively conventional methods of amide preparation such as the reaction of an alkylhydroxybenzylamine and an alkanoic or alkenoic acid chloride are employed.

In the case of the N-(alkylhydroxybenzyl)acrylamides of the present invention, the further optional step of addition of an alkylmercaptan can be employed to yield the corresponding N-(alkylhydroxybenzyl) - 3 - alkylthiopropionamides of the present invention. This reaction is conducted in the presence of a base catalyst such as an alkali metal alkoxide and in an inert organic solvent such as ethyl ether. Moreover, if hydrogen sulfide is employed in place of the mercaptan, the coupling of two molecules of the acrylamide occurs across the thio linkage, thus yielding a bis[N-(alkylhydroxybenzyl)propionamide]sulfide.

These N-(alkylhydroxybenzylacrylamides are also useful for polymerization, both to form polymeric antioxidants and to incorporate minor yet effective amounts of antioxidant monomers into an acrylic polymer or copolymer.

The following examples will serve to further typify the nature of the present invention.

Example 1

To 100 ml. of acetonitrile, which is cooled in an ice bath and stirred, are added in a dropwise fashion over a period of 5 minutes, 7.5 ml. of concentrated sulfuric acid. There are next added in portions, over a 20 minute period, 26.3 g. of 3,5-di-t-butyl-4-hydroxybenzyl alcohol, maintaining the temperature below 10° C. At the end of the addition, the reaction mixture is allowed to attain room temperature, stirred for two hours and allowed to stand for 15 hours. The reaction mixture is then poured into 200 ml. of water and the solid which forms upon standing and cooling is collected by filtration, washed with 100 ml. of water and dried in vacuo over phosphorus pentoxide to yield N-(3,5-di-t-butyl-4-hydroxybenzyl)acetamide which may be further purified through recrystallization from heptane, M.P. 132–133° C.

In a similar fashion by employing 2-methyl-4-hydroxy-5-t-butylbenzyl alcohol, 3-methyl-4-hydroxy-5-t-butylbenzyl alcohol and 3,5-di-i-propyl-4-hydroxybenzyl alcohol in the foregoing procedure. There are respectively obtained N-(2-methyl-4-hydroxy-5-t-butylbenzyl)acetamide; N-(3-methyl-4-hydroxy-5-t-butylbenzyl)acetamide; and N-(3,5-di-i-propyl-4-hydroxybenzyl)acetamide.

Example 2

A mixture of 7.5 ml. of concentrated sulfuric acid and 36.2 g. of undecanenitrile is cooled to about 5° C. and 23.6 g. of 3,5-di-t-butyl-4-hydroxybenzyl alcohol are added in portions over a 50 minute period, maintaining the reaction temperature below 10° C. The temperature is allowed to reach about 25° C. and stirring is continued for an additional 6 hours. The mixture is allowed to stand at room temperature for 15 hours and is then extracted with 400 ml. of ether. These extracts are washed five times with 200 ml. portions of water, dried over magnesium sulfate and evaporated. The residual material is fractionally distilled and the highest boiling fraction then redistilled to yield N-(3,5-di-t-butyl-4-hydroxybenzyl)-dodecanamide, B.P. 228–232° C./20–50μ.

*Analysis.*—Calcd. for $C_{27}H_{47}NO_2$ (percent): C, 77.64; H, 11.34. Found (percent): C, 77.70; H, 11.46.

Example 3

To a mixture of 7.5 ml. of concentrated sulfuric acid and 100 ml. of acrylonitrile, cooled to about 5° C., are added over a 30 minute period, 23.6 g. of 3,5-di-t-butyl-4-hydroxybenzyl alcohol, maintaining the reaction temperatures below 10° C. Upon completion of the addition, the reaction mixture is stirred for 2½ hours at room temperature, then cooled to 5° C. and filtered. The solid thus collected is washed twice with 50 ml. portions of cold benzene and then air-dried to yield N-(3,5-di-t-butyl-hydroxybenzyl)acrylamide which is further purified through several recrystallization from 60% aqueous ethanol, M.P. 114–116.

In a similar fashion by employing 3-methyl-4-hydroxy-5-t-butylbenzyl alcohol and 3,5-di-i-propyl-4-hydroxybenzyl alcohol, there are respectively obtained N-(3-methyl-4-hydroxy-5 - t - butylbenzyl)acrylamide and N-(3,5-di-i-propyyl-4-hydroxybenzyl)acrylamide.

Example 4

A slurry of 5.79 g. of N-(3,5-di-t-butyl-4-hydroxybenzyl)acrylamide and 3.02 g. of N-octylmercaptan in 20 ml. of ether and four drops of tetramethylammonium hydroxide is allowed to stand for 24 hours. The mixture is washed three times with 25 ml. portions of water, dried over magnesium sulfate and evaporated in vacuo. The residual oil is distilled to yield N-(3,5-di-t-butyl-4-hydroxybenzyl) - 3 - octylthiopropionamide, B.P. 242–244° C./50μ.

Example 5

To a solution of 8.68 g. of N-(3,5-di-t-butyl-4-hydroxybenzyl)acrylamide and 8.6 g. of octadecylmercaptan in 70 ml. of ether is added 0.1 g. of sodium methoxide. This mixture is allowed to stand for 48 hours at room temperature with occasional agitation and is then washed three times with 50 ml. portions of water, dried over magnesium sulfate, and evaporated. The residual oil crystallizes upon standing to yield N-(3,5-di-t-butyl-4-hydroxybenzyl) - 3 - octadecylthiopropionamide which is further purified through recrystallization from methanol, M.P. 61–62.5° C.

In a like fashion other alkyl mercaptans such as eicosyl mercaptan, triacontyl mercaptan and the like are employed to yield the corresponding N-(3,5-di-t-butyl-4-hydroxybenzyl)-3-alkylthiopropionamides.

Example 6

A stream of hydrogen sulfide is passed through an ethereal solution of 5 grams of N-(3,5-di-t-butyl-4-hydroxybenzyl)acrylamide containing 0.1 g. of sodium methoxide for five hours. The mixture is then washed three times with 75 ml. portions of water, dried over magnesium sulfate and evaporated to yield bis-[(3,5-di-t-butyl-hydroxybenzyl)propionamide]sulfide.

Example 7

To a solution of 10.8 g. of adipyldinitrile in 100 ml. of benzene, cooled in an ice bath, are added in a dropwise fashion over a five minute period 7.5 ml. of concentrated sulfuric acid. There is next added in portions over a twenty minute period, 47.2 g. of 3,5-di-t-butyl-4-hydroxybenzyl alcohol, maintaining a temperature of below 10° C. The mixture is stirred at room temperature for three hours and then allowed to stand for fifteen hours. The mixture is then poured into water, the organic layer is separated and retained and the aqueous layer extracted once with methylene chloride. The combined organic layer and organic extract are washed with water, dried and evaporated to yield N,N'-bis-(3,5-di-t-butyl-4-hydroxybenzyl)adipamide.

Example 8

Samples of compounds of the present invention were solvent blended with methylene chloride in unstabilized polypropylene flake (Hercules Profax 6501) at the indicated percentage composition. After removal of the solvent, the mixture was milled at 360° F. on a 6″ x 13″ two roll plastics mill for five minutes. The milled sheets were compression molded for 3 minutes at 175 lbs./in.²/ 425° F. by means of a four cavity picture frame mold into 5″ x 5″ 25 mil placques which are cooled by immersion in cold water. Duplicate samples of ½″ x 1″ are aged in a forced draft oven at 149° C. until the first sign of failure (crazing, embrittlement or decomposition).

| Compound | Amount, percent | Hours to failure |
|---|---|---|
| None | | 3 |
| N-(3,5-di-t-butyl-4-hydroxybenzyl)acetamide | 0.5 | 60 |
| N-(3,5-di-t-butyl-4-hydroxybenzyl)acrylamide | 0.5 | 23 |
| N-(3,5-di-t-butyl-4-hydroxybenzyl)dodecanamide | 0.5 | 75 |
| N-(3,5-di-t-butyl-4-hydroxybenzyl)-3-octylthiopropionamide | 0.5 | 90 |
| N-(3,5-di-t-butyl-4-hydroxybenzyl)-3-ocadecylthiopropionamide | 0.1 | 70 |
| | 0.5 | 575 |

Example 9

To 10 ml. of cyclohexene which has been dried over calcium chloride and distilled from sodium was added 0.001% of N-(3,5-di-t-butyl-4-hydroxybenzyl)acetamide. After checking for the presence of peroxides with potassium iodide, the solution was placed in a glass bomb liner which in turn was sealed in a stainless steel oxygen bomb and charged with oxygen at 100 lbs./in.² with three flushings. The bomb was heated at 100° C. by means of a water bath. The breakpoint indicating oxidation of the cyclohexene was noted at the point of a pressure drop of 15 lbs./in.² per 15 minutes which continues for another 15 minutes. The time from the beginning of the test to the breakpoint was 68 minutes for the stabilized sample. An unstabilized sample reached the breakpoint in 30 minutes.

What is claimed is:

1. A compound of the formula:

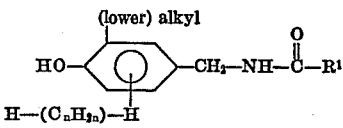

wherein $R^1$ is alkyl thioethylene wherein the alkyl group contains from 1 to 18 carbon atoms, or the group

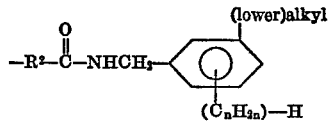

wherein $R^2$ is $-C_2H_4-S-C_2H_4-$; $n$ has a value of from 1 to 4, and the (lower)alkyl group has from 1 to 4 carbon atoms, such that the $H-(C_nH_{2n})$ group is either ortho to the hydroxy group or meta to the hydroxy group and para to the (lower)alkyl group.

2. A compound of claim 1 wherein the group $(C_nH_{2n})-H$ is ortho to the hydroxy group.

3. A compound of claim 2 wherein both (lower)alkyl and $(C_nH_{2n})-H$ are tert-butyl groups.

4. A compound according to claim 1 wherein $R^1$ is alkylthioethylene wherein the alkyl group has from 1 to 18 carbon atoms.

5. A compound according to claim 1 wherein the compound is N-(3,5-di-t-butyl-hydroxybenzyl) - 3 - octylthiopropionamide.

6. A compound according to claim 1 wherein the compound is N-(3,5-di-t-butyl-hydroxybenzyl) - 3 - octadecylthiopropionamide.

7. A compound according to claim 1 wherein the compound is bis-[N-(3,5-di-t-butyl-4-hydroxybenzyl)propionamide]sulfide.

References Cited

UNITED STATES PATENTS

| | | | |
|---|---|---|---|
| 3,457,328 | 7/1969 | Blatz et al. | 260—562 |
| 3,433,835 | 3/1969 | Muller et al. | 260—562 |
| 3,057,868 | 10/1962 | Ishidate | 260—287 |
| 2,237,296 | 4/1941 | Baldwin et al. | 260—404 |

FOREIGN PATENTS

| | | | |
|---|---|---|---|
| 2,457,152 | 9/1966 | France | 260—562 |

HARRY I. MOATZ, Primary Examiner

U.S. Cl. X.R.

260—45.9 R, 562 S, 562 A; 252—402, 403